United States Patent
Chung

(10) Patent No.: US 8,970,481 B2
(45) Date of Patent: Mar. 3, 2015

(54) METHOD FOR ADJUSTING DISPLAY MANNER OF PORTABLE ELECTRONIC DEVICE

(75) Inventor: Meng-Pang Chung, Tao Yuan Shien (TW)

(73) Assignee: Quanta Computer Inc., Guishan Dist., Taoyuan (TW)

( * ) Notice: Subject to any disclaimer, the term of this patent is extended or adjusted under 35 U.S.C. 154(b) by 231 days.

(21) Appl. No.: 13/617,108

(22) Filed: Sep. 14, 2012

(65) Prior Publication Data
US 2013/0194176 A1    Aug. 1, 2013

(30) Foreign Application Priority Data
Jan. 31, 2012   (TW) .............................. 101103029 A

(51) Int. Cl.
*G09G 5/00*   (2006.01)

(52) U.S. Cl.
USPC ............ 345/156; 345/660; 345/662; 345/169

(58) Field of Classification Search
CPC ... G06F 3/0346; G06F 3/0484; G06F 3/0418; G06F 3/04886
USPC .......................... 345/156, 168, 169, 660, 662; 348/207.1; 726/18
See application file for complete search history.

(56) References Cited

U.S. PATENT DOCUMENTS

| | | | |
|---|---|---|---|
| 5,559,321 A * | 9/1996 | Kusaka ....................... 250/201.8 |
| 2008/0062134 A1* | 3/2008 | Duarte et al. ................. 345/169 |
| 2010/0188371 A1 | 7/2010 | Lowles et al. | |
| 2011/0285631 A1* | 11/2011 | Imamura et al. .............. 345/168 |
| 2012/0281101 A1* | 11/2012 | Fujinawa et al. .......... 348/207.1 |
| 2013/0061317 A1* | 3/2013 | Runstedler et al. ............. 726/18 |
| 2013/0154941 A1* | 6/2013 | Moser ........................... 345/168 |

FOREIGN PATENT DOCUMENTS

TW   200915168   4/2009

OTHER PUBLICATIONS

Taiwanese language office action dated May 21, 2014.
English language translation of abstract of TW 200915168 (published Apr. 1, 2009).

\* cited by examiner

*Primary Examiner* — Thuy Pardo
(74) *Attorney, Agent, or Firm* — McClure, Qualey & Rodack, LLP

(57) ABSTRACT

A portable electronic device includes a display screen, a gravity sensor, at least one sensor provided at a side of the portable electronic device and a processor. The gravity sensor detects gravity information of the portable electronic device and generates a sensing value. The at least one sensor senses a holding position. The processor determines a holding manner according to sensing signals of the at least one sensor and determines a display mode of the display screen according to the sensing value and the holding manner.

8 Claims, 5 Drawing Sheets

METHOD FOR ADJUSTING DISPLAY MANNER OF PORTABLE ELECTRONIC DEVICE

CROSS REFERENCE TO RELATED APPLICATIONS

This Application claims priority of Taiwan Patent Application No. 101103029, filed on Jan. 31, 2012, the entirety of which is incorporated by reference herein.

BACKGROUND OF THE INVENTION

1. Field of the Invention

The invention relates to display manners of portable electronic devices and more particularly to methods for adjusting display manners of portable electronic devices.

2. Description of the Related Art

Current portable electronic devices such as smart phones and tablets often automatically determine rotating directions of screens according to sensing values of gravity sensors (G-sensor) or orientation sensors. A gravity sensor may detect a change in the gravitational direction of a portable electronic device, and thus a display direction of a screen of the portable electronic device may be adjusted accordingly so as to be suitable for users when they watch the screen or manipulate the portable electronic device. For example, when the portable electronic device is oriented in a portrait orientation (that is, the right side and the left side of the portable electronic device are long sides and the top side and the bottom side of the portable electronic device are short sides), the screen is under a portrait mode, and when the portable electronic device is oriented in a landscape orientation (that is, the right side and the left side of the portable electronic device are short sides and the top side and the bottom side of the portable electronic device are long sides), the screen is under a landscape mode. However, if an angle between the portable electronic device and the horizontal plane (ground plane) is not sufficiently large enough, for example, when the portable electronic device is laid on a table, even though a user rotates the portable electronic device (that is, the screen is almost parallel to the horizontal plane while the user rotates the portable electronic device), three dimensional components of the gravitational direction affecting to the portable electronic device barely change. Thus, the gravity sensor may not effectively determine the proper rotated direction of the screen. In this case, a user usually needs to do extra actions, such as erecting the portable electronic device first, rotating the portable electronic device to the desired direction and then laying the portable electronic device on the table, to make the screen display in the desired display mode. Accordingly, a user may feel that this is inconvenient.

BRIEF SUMMARY OF THE INVENTION

In view of this, the invention provides a method for determining a rotated direction of a screen according to a gravity sensor and a holding manner, i.e. how a user holds a portable electronic device. In the method, a user interface is further adjusted accordingly. Therefore, the portable electronic device may be more convenient to use.

An embodiment of the invention provides a portable electronic device, comprising: a display screen; a gravity sensor, detecting gravity information of the portable electronic device and generating a sensing value; at least one sensor, provided at a side of the portable electronic device, sensing a holding position; and a processor, determining a holding manner according to sensing signals of the at least one sensor and determining a display mode of the display screen according to the sensing value and the holding manner.

Another embodiment of the invention provides a method for adjusting a display manner of a screen of a portable electronic device, comprising: detecting gravity information of the portable electronic device and generating a sensing value by a gravity sensor; sensing a holding position by at least one sensor provided at a side of the portable electronic device; determining a holding manner by a processor according to sensing signals of the at least one sensor; and determining a display mode of the display screen by the processor according to the sensing value and the holding manner.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
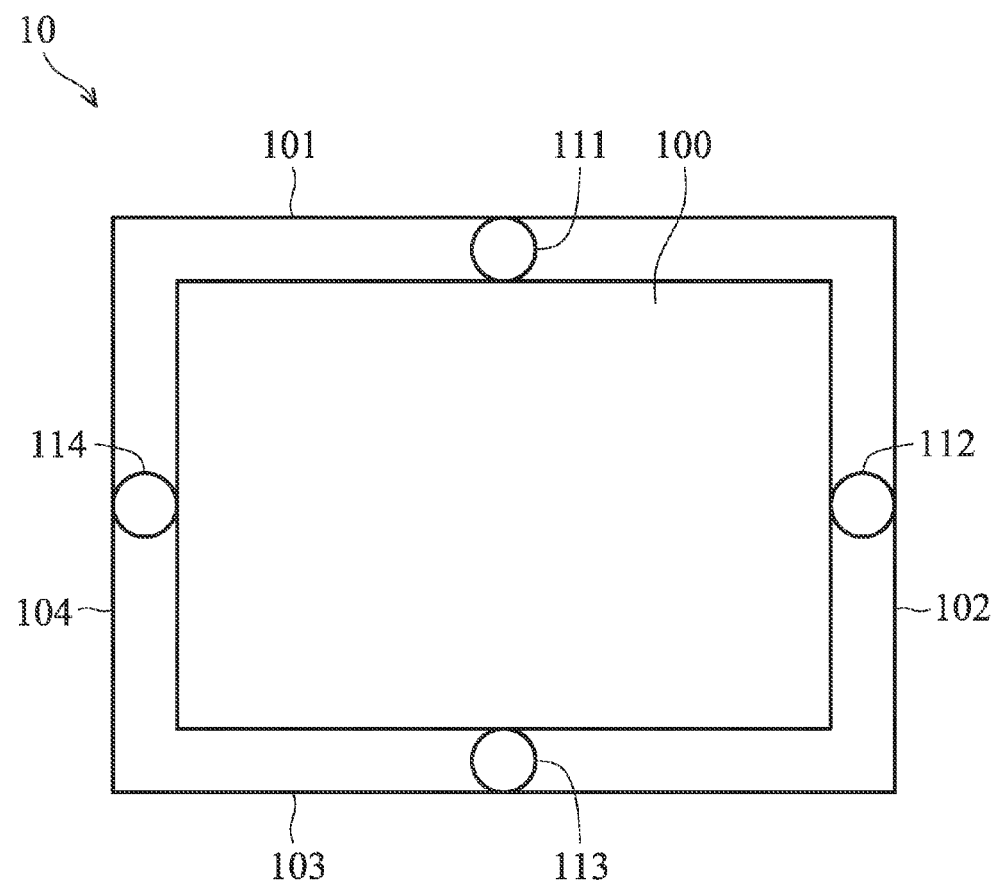
FIG. 1 is a block diagram of a portable electronic device according to an embodiment of the invention.

FIG. 1 illustrates a block diagram of a portable electronic device 10 according to an embodiment of the invention. The portable electronic device 10 comprises a display screen 100, a gravity sensor (not shown), sensors 111, 112, 113 and 114 and a processor (not shown). The sensors 111 and 113 are respectively configured on two sides opposite to each other; that is, the long sides 101 and 103. The sensors 112 and 114 are respectively configured on the other two sides opposite to each other; that is, the short sides 102 and 104. The display screen 100 is configured in a space surrounded by the long sides 101 and 103 and the short sides 102 and 104. The sensors 111, 112, 113 and 114 are used to sense the positions of hands so as to determine how a user is holding the portable electronic device 10, i.e. a holding manner. For example, when the user holds the short side 104 of the portable electronic device 10, the sensor 114 senses the holding position of the user and generates a sensing signal. Then the sensor 114 transmits the sensing signal to the processor. Accordingly, the processor may determine that the user is holding the short side 104 of the portable electronic device 10 according to the sensing signal from the sensor 114. Therefore, when an orientation of the portable electronic device 10 is close to a horizontal-lying orientation (that is, an angle between the display screen 100 of the portable electronic device 10 and the horizontal plane is not sufficiently large enough), the processor determines the holding manner of the user according to a sensing signal from at least one of the sensors 111, 112, 113 and 114, and then the processor further determines a display mode of the display screen 100 according to the holding manner of the user, such as a landscape mode or a portrait mode. Then the processor rotates a picture frame of the display screen 100 to be in the determined display mode. For example, if the sensor 112 and/or the sensor 114 generate sensing signals, it means that a holding position of the user is on the short side 102 and/or the short side 104. Thus, the display mode of the display screen 100 can be determined to be the landscape mode. If the sensor 111 and/or the sensor 113 generate sensing signals, it means that the holding position of the user is on the long side 101 and/or the long side 103. Thus, the display mode of the display screen 100 can be determined to be the portrait mode. Therefore, even though the angle between the portable electronic device 10 and the horizontal plane is not sufficiently large enough, determination of whether the display mode of the display screen 100 is the portrait mode or the landscape mode can be made based on the sensing of the sensors.

Figure 2A:
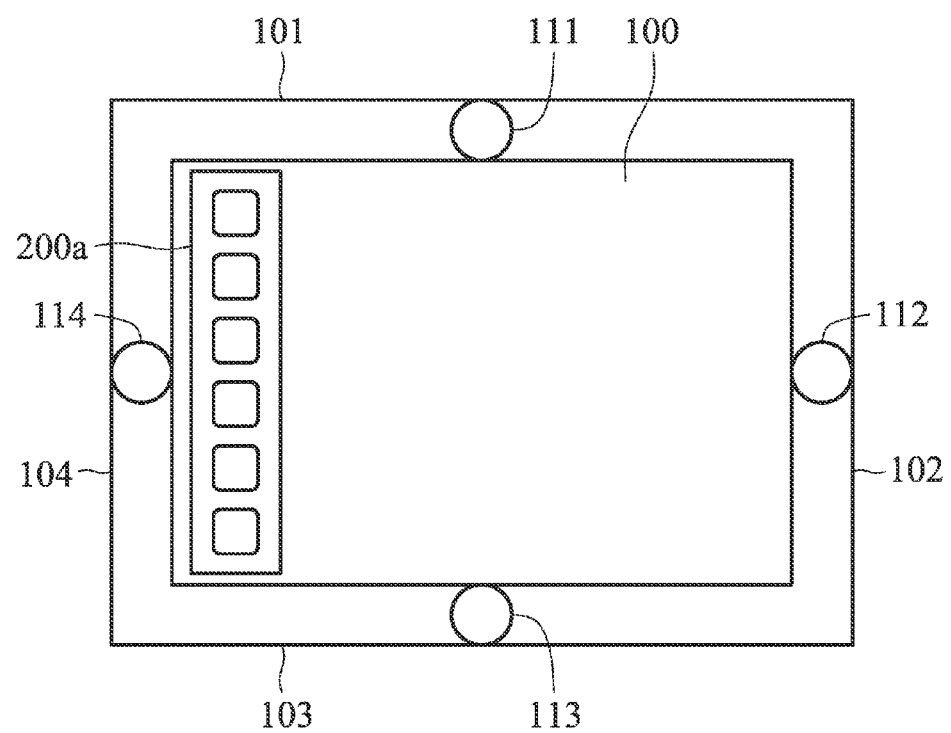
FIG. 2a and FIG. 2b are block diagrams of a user interface of the portable electronic device in FIG. 1.
Figure 2B:
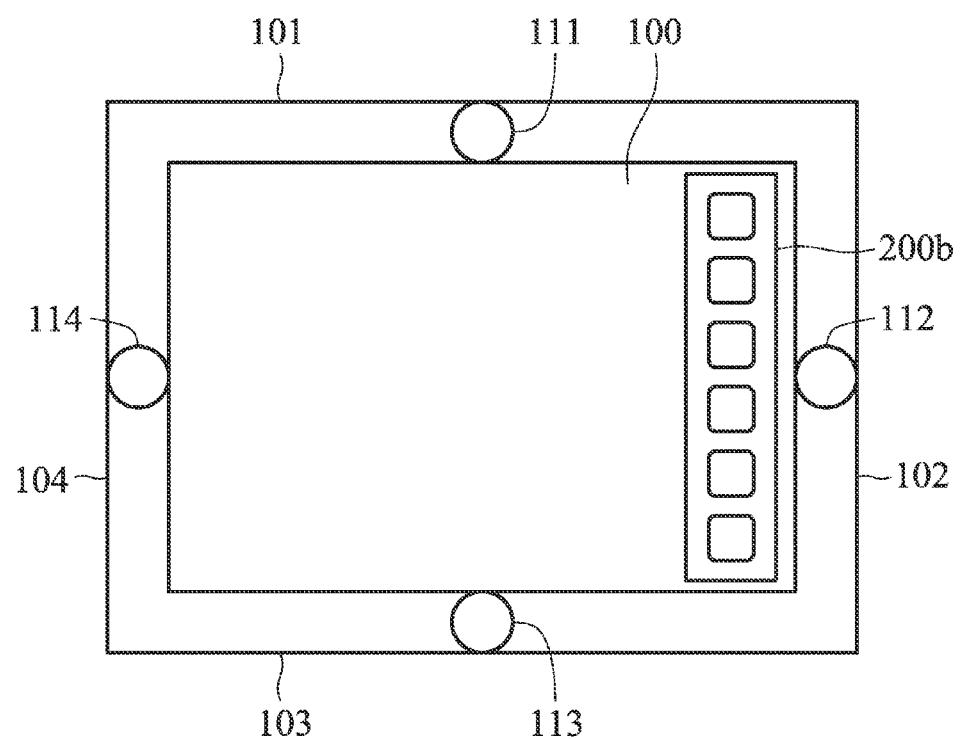

In addition, the processor may further determine which hand of the user is being used to operate the portable electronic device 10 according to a sensing signal from at least one of the sensors 111, 112, 113 and 114. Therefore, a display layout of a user interface of the portable electronic device 10 can be adjusted accordingly. For example, when the portable electronic device 10 is in the landscape mode (which is set and determined according to the gravity sensor or sensing signals from the sensor 112 and/or the sensor 114), as shown in FIG. 2a, if the sensing signal is generated from the sensor 112, it is determined that the user is using a right hand to hold the portable electronic device 10. Accordingly, it is assumed that the left hand of the user is being used to operate the portable electronic device 10. Therefore, the user interface of the portable electronic device 10 is adjusted by the processor to be suitable for the situation where the left hand is used to operate the portable electronic device 10. For example, a position of a menu 200a is adjusted to be close to the left-hand side (here, the short side 114) and a stroke input method is adjusted to be suitable for left-handed input and so on. Similarly, when the portable electronic device 10 is in the landscape mode (which is set and determined according to the gravity sensor or sensing signals from the sensor 112 and/or the sensor 114), as shown in FIG. 2b, if the sensing signal is generated from the sensor 114, it is determined that the user is using a left hand to hold the portable electronic device 10. Accordingly, it is assumed that the user is using a right hand to operate the portable electronic device 10. Therefore, the user interface of the portable electronic device 10 is adjusted by the processor to be suitable for the situation where the right hand is being used to operate the portable electronic device 10. For example, a position of a menu 200b is adjusted to be close to the right-hand side (here, the short side 112) and a stroke input method is adjusted to be suitable for right-handed input and so on. Moreover, similar to determining which hand of the user is being used to operate the portable electronic device 10, the processor may also determine whether the user is left-handed or right-handed according to a sensing signal from at least one of the sensors 111, 112, 113 and 114 so as to adjust the display layout of the user interface and settings of application programs.

The number of the sensors in FIG. 1 is only exemplary and the invention is not limited thereto. For example, more sensors can be provided on the long side 101 and the long side 103. In one embodiment, if the portable electronic device 10 can only be used in the landscape mode (or the portrait mode), sensors are provided only on the short side 104 and/or the short side 102 (or the long side 101 and/or the long side 103) to determine whether the user is holding the portable electronic device 10. Therefore, the cost is decreased in this situation. In addition, positions of the sensors don't have to be in the middle of the sides and may be adjusted according to the configuration of the portable electronic device, such as a layout of buttons.

In one embodiment, the sensors 111, 112, 113 and 114 are proximity sensors, such as inductive proximity sensors, capacitive proximity sensors, optical proximity sensors or magnetic proximity sensors. When a hand is close to a sensing range of at least one of the sensors 111, 112, 113 and 114, the sensors 111, 112, 113 and 114 determine whether the hand is close to the portable electronic device 10 or whether the hand has touched the portable electronic device 10 through proximity sensing, converting signals obtained from the sensing into electronic signals (sensing signals) and transmitting the sensed signals to the processor to determine the holding manner.

In another example, if the display screen is a touch screen, an outer part of the touch screen may be used as the sensors 111, 112, 113 and 114. The processor may determine the holding manner according touch signals from the outer part of the touch screen to determine the display mode of the display screen 100. In other words, the touch function of the outer part of the touch screen is used to carry out the function of the sensors 111, 112, 113 and 114. For example, when a hand holds the short side 104, the sensor 114 may sense a continuous touch event and transmit a sensing signal to the processor. The processor determines that the hand is holding the short side 104 according to the sensing signal transmitted by the sensor 114 and then adjusts the display mode of the display screen and the display layout of the user interface.

In another example, the sensors 111, 112, 113 and 114 may be temperature sensors. When a hand touches at least one of the long side 101 and 03 and the short side 102 and 104, the temperature sensors sense the temperature of the hand and transmit signals to the processor to determine the holding manner.

The sensors 111, 112, 113 and 114 are not limited to be proximity sensors, a part of a touch screen and temperature sensors. For example, the sensors 111, 112, 113 and 114 may be optical sensors that sense the position of the hand based on whether a light is sheltered by the hand so as to determine the holding manner. In addition, for avoiding unnecessary screen rotation caused by a mistaken touch, the processor may determine whether the time when the hand is holding the portable electronic device 10 is larger than a predetermined time according to the sensing signals so as to determine whether the hand is holding the portable electronic device 10 or not. If the time when the hand is holding the portable electronic device 10 is larger than the predetermined time, it is determined that a hand is holding the portable electronic device 10. Otherwise, it is determined that a hand is not holding the portable electronic device 10.

Figure 3:
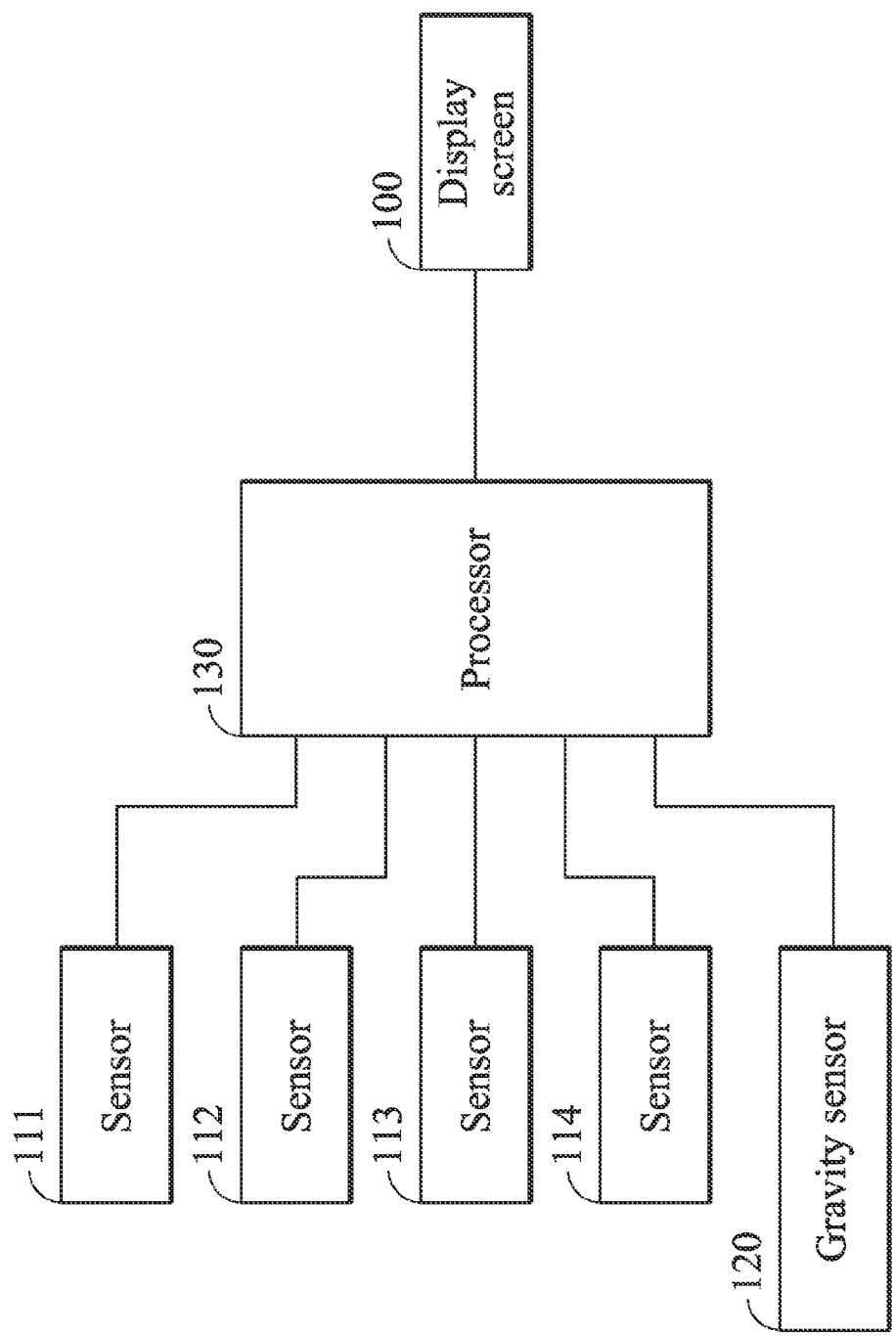
FIG. 3 is a block diagram of the portable electronic device in FIG. 1.

FIG. 3 illustrates a block diagram of the portable electronic device 10 in FIG. 1. Same notation numbers are used to denote same elements as in FIG. 1. The portable electronic device 10 comprises the display screen 100, the sensors 111, 112, 113 and 114, the gravity sensor 120 and the processor 130. The gravity sensor 120 detects gravity information of the portable electronic device 10 and generates a sensing value. As shown in FIG. 1, the sensors 111, 112, 113 and 114 are respectively provided on the long side 101, the short side 102, the long side 103 and the short side 104 of the display screen 100. The sensors 111, 112, 113 and 114 are used to sense a holding position. The processor 130 determines a holding manner according to sensing signals of the sensors 111, 112, 113 and 114. For example, when the processor 130 receives a sensing signal/sensing signals from a sensor/sensors on the long side/sides (such as the sensor 111 and/or the sensor 113), the processor 130 determines that the holding manner is a portrait type. When the processor 130 receives a sensing signal/sensing signals from a sensor/sensors on the short side/sides (such as the sensor 111 and/or the sensor 113), the processor 130 determines that the holding manner is a landscape type.

In one embodiment, the processor 130 determines an orientation and rotates the picture frame of the display screen 100 and the display layout of the user interface according to the sensing value of the gravity sensor 120 and the holding manner. For example, if the orientation of the portable electronic device 10 is determined to be the portrait orientation according to the sensing value of the gravity sensor 120, the display mode of the display screen 100 is the portrait mode. If the orientation of the portable electronic device 10 is determined to be the landscape orientation according to the sensing value of the gravity sensor 120, the display mode of the display screen 100 is a landscape mode. If the orientation of the portable electronic device is determined to be close to the horizontal-lying orientation according to the sensing value of the gravity sensor 120, the display mode of the display screen 100 is further determined according to the holding manner. For example, if the holding manner is the portrait type, the display mode of the display screen 100 is the portrait mode. If the holding manner is the landscape type, the display mode of the display screen 100 is the landscape mode.

In another embodiment, the processor 130 first determines the holding manner according to the sensing signals of the sensors 111, 112, 113 and 114. For example, when the processor 130 receives a sensing signal/sensing signals from a sensor/sensors on the long side/sides (such as the sensor 111 and/or the sensor 113), the holding manner is determined to be the portrait type, and the display mode is the portrait mode. When the processor 130 receives a sensing signal/sensing signals from a sensor/sensors on the short side/sides (such as the sensor 111 and/or the sensor 113), the holding manner is determined to be the landscape type, and the display mode is the landscape mode. Then the processor 130 further determines an upside and a downside of the picture frame according to the sensing value of the gravity sensor 120. For example, when the user holds the short side 104, the processor 130 first determines that the holding manner is the landscape type, and the display mode of the display screen 100 is the landscape mode accordingly. Then the processor 130 further determines whether the upside of the picture frame in the landscape mode is the long side 101 or the long side 103 according to the sensing value of the gravity sensor 120 so as to determine the upside and the downside of the picture frame and avoid the situation where the picture frame is upside-down relative to the user even though the display is in a landscape mode.

In one embodiment, the processor 130 first determines the display mode according to the sensing value of the gravity sensor and/or sensing signals generated from the sensors 111, 112, 113 and 114 and then adjusts the user interface according to the sensing signals generated from the sensors 111, 112, 113 and 114, such as the position of the menu, settings of the stroke input method and so on.

Figure 4:
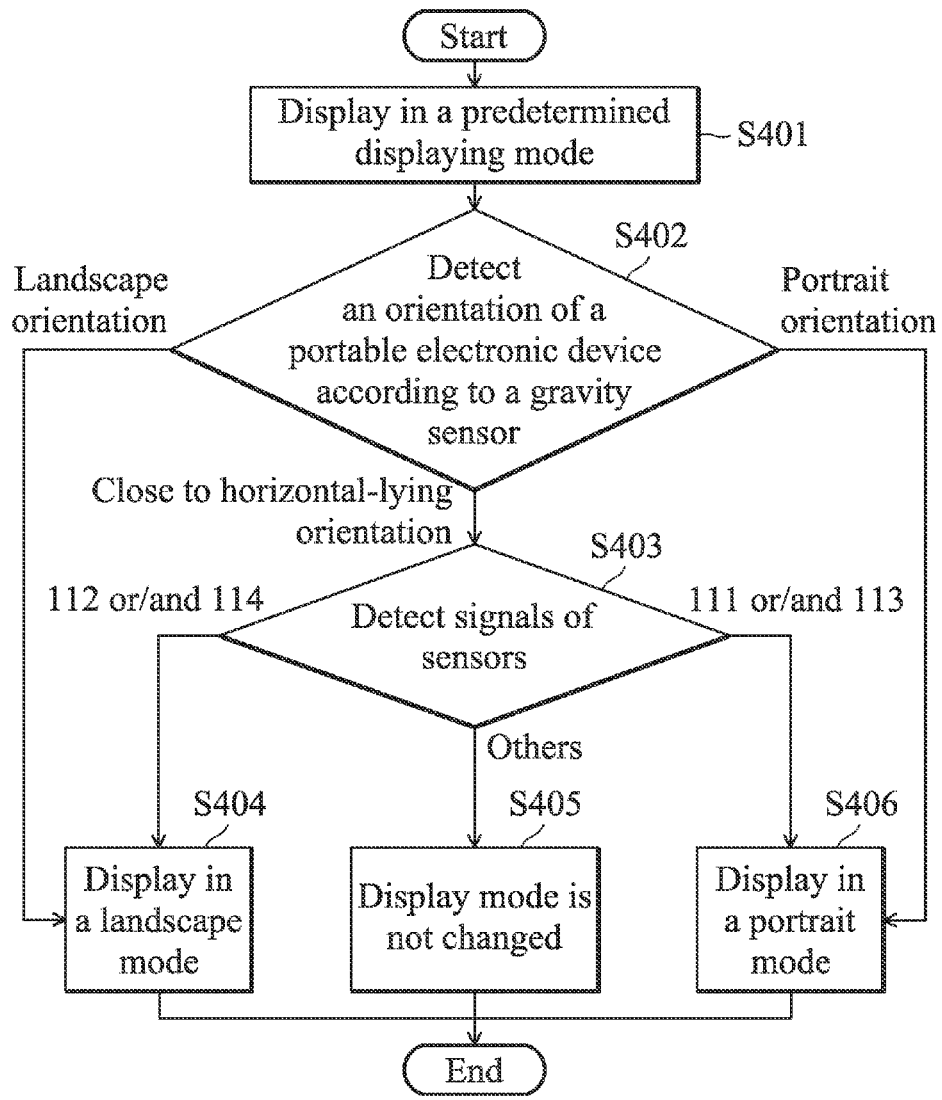
FIG. 4 is a flow chart of a method for adjusting a display manner of a screen of a portable electronic device according to an embodiment of the invention.

FIG. 4 illustrates a flow chart of a method for adjusting a display manner of a screen of a portable electronic device according to an embodiment of the invention. In step S401, a display screen displays a picture frame in a predetermined display mode. For example, if the predetermined display mode is the portrait mode, the display screen displays the picture frame in the portrait mode. In step S402, an orientation of the portable electronic device is determined according to a sensing value of a gravity sensor. If the orientation of the portable electronic device is the landscape orientation (that is, the right side and the left side of the portable electronic device are short sides and the top side and the bottom side of the portable electronic device are long sides), the display mode of the display screen is adjusted to be the landscape mode as shown in step S404. If the orientation of the portable electronic device is the portrait orientation (that is, the right side and the left side of the portable electronic device are long sides and the top side and the bottom side of the portable electronic device are short sides), the display mode of the display screen is adjusted to be the portrait mode as shown in step S406. If the orientation of the portable electronic device is the horizontal-lying orientation (that is, the display screen of the portable electronic device is sufficiently parallel to the horizontal plane), signals of sensors such as the sensors 111, 112, 113 and 114 in FIG. 1 are detected. If the sensor 112 and/or the sensor 114 transmits/transmit a sensing signal/sensing signals to a processor, it is determined whether a hand/hands of a user is/are holding onto the short side 102 and/or the short side 104, and then the display mode of the display screen is adjusted to be the landscape mode as shown in step S404. If the sensor 111 and/or the sensor 113 transmits/transmit a sensing signal/sensing signals to the processor, whether a hand/hands of a user is/are holding onto the long side 101 and/or the long side 103 is determined, and then the display mode of the display screen is adjusted to be the portrait mode as shown in step S406. If none of the sensors 111, 112, 113 and 114 transmits a sensing signal or all of the sensors 111, 112, 113 and 114 transmit a sensing signal at the same time, the display mode doesn't change, as shown in step S405.

In one example, if an angle between the portable electronic device and the horizontal plane is within ±10°, the orientation of the portable electronic device is determined to be close to the horizontal-lying orientation. The range ±10° is only exemplary and may be adjusted according to the sensing ability of the gravity sensor.

As described above, in the invention, sensors are provided around a display screen of a portable electronic device to detect a holding manner of a user so as to determine an angle and an orientation of a screen rotation in cooperation with a gravity sensor. Therefore, problems which occur when the portable electronic device is close to a horizontal-lying orientation may be improved. In addition, a display layout and settings of a user interface may be adjusted accordingly, and thus the portable electronic device may be more convenient to use.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a display screen;
   a gravity sensor, detecting gravity information of the portable electronic device and generating a sensing value;
   at least one sensor, provided at a side of the portable electronic device, sensing a holding position; and
   a processor, determining a holding manner according to sensing signals of the at least one sensor and determining a display mode of the display screen according to the sensing value and the holding manner,
   wherein the processor determines an orientation of the portable electronic device according to the sensing value of the gravity sensor, and if the orientation of the portable electronic device is close to a horizontal-lying orientation, the processor determines the display mode of the display screen according to the holding manner.

2. The portable electronic device as claimed in claim 1, wherein if the orientation of the portable electronic device is a portrait orientation, the display mode of the display screen is a portrait mode, and if the orientation of the portable electronic device is a landscape orientation, the display mode of the display screen is a landscape mode.

3. The portable electronic device as claimed in claim 2, wherein when the orientation of the portable electronic device is close to the horizontal-lying orientation, if the side is a long side of the portable electronic and the processor receives the sensing signals from the at least one sensor, the display mode of the display screen is the portrait mode, and if the side is a short side of the portable electronic and the processor receives the sensing signals from the at least one sensor, the display mode of the display screen is the landscape mode.

4. The portable electronic device as claimed in claim 3, wherein the processor further adjusts a display layout of a user interface of the portable electronic device according to the holding manner.

5. A method for adjusting a display manner of a screen of a portable electronic device, comprising:
   detecting gravity information of the portable electronic device and generating a sensing value by a gravity sensor;
   sensing a holding position by at least one sensor provided at a side of the portable electronic device;
   determining a holding manner by a processor according to sensing signals of the at least one sensor;
   determining a display mode of the display screen by the processor according to the sensing value and the holding manner; and
   determining an orientation of the portable electronic device according to the sensing value; and
   if the orientation of the portable electronic device is close to a horizontal-lying orientation, determining the display mode of the display screen according to the holding manner.

6. The method as claimed in claim 5, further comprising:
   if the orientation of the portable electronic device is a portrait orientation, determining the display mode of the display screen to be a portrait mode; and
   if the orientation of the portable electronic device is a landscape orientation, determining the display mode of the display screen to be a landscape mode.

7. The method as claimed in claim 6, wherein when the orientation of the portable electronic device is close to the horizontal-lying orientation, the method further comprises:
   if the side is a long side of the portable electronic and the sensing signals are received from the at least one sensor, determining the display mode of the display screen to be the portrait mode; and
   if the side is a short side of the portable electronic and the sensing signals are received from the at least one sensor, determining the display mode of the display screen to be the landscape mode.

8. The method as claimed in claim 7, further comprising:
   adjusting a display layout of a user interface of the portable electronic device according to the holding manner.

* * * * *